United States Patent
Li et al.

(10) Patent No.: US 9,650,254 B2
(45) Date of Patent: May 16, 2017

(54) METHOD FOR PREPARATION OF ACTIVE CARBON BY PYROLYSIS OF ORGANICS

(75) Inventors: Aimin Li, Liaoning (CN); Ningbo Gao, Liaoning (CN); Liaoyuan Mao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 474 days.

(21) Appl. No.: 14/115,625

(22) PCT Filed: Apr. 1, 2011

(86) PCT No.: PCT/CN2011/072388
§ 371 (c)(1),
(2), (4) Date: Nov. 4, 2013

(87) PCT Pub. No.: WO2012/129814
PCT Pub. Date: Oct. 4, 2012

(65) Prior Publication Data
US 2014/0105810 A1    Apr. 17, 2014

(51) Int. Cl.
*C01B 31/08* (2006.01)
*C10B 49/10* (2006.01)
(Continued)

(52) U.S. Cl.
CPC ............ *C01B 31/08* (2013.01); *C01B 31/081* (2013.01); *C10B 49/10* (2013.01); *C10B 53/02* (2013.01);
(Continued)

(58) Field of Classification Search
CPC ....... C01B 31/081; C10B 49/10; C10B 53/02; Y02E 50/14
(Continued)

(56) References Cited

U.S. PATENT DOCUMENTS 4,313,849 A * 2/1982 Tuovinen ............ C01B 31/081
201/33
5,589,599 A * 12/1996 McMullen ............ C01B 31/08
208/13

(Continued)

FOREIGN PATENT DOCUMENTS

CN   1313834 A    9/2001
CN   101289184 A  10/2008

(Continued)

*Primary Examiner* — Richard M Rump
(74) *Attorney, Agent, or Firm* — Muncy, Geissler, Olds & Lowe, P.C.

(57) ABSTRACT

A method of production of active carbon by pyrolysis of organic materials, includes pyrolysis unit, reforming unit, drying unit, purification unit, gas storage unit and high temperature regenerative combustion unit. Organic materials are subjected to pyrolysis reaction in pyrolysis unit to produce combustible gas, tar and char. Combustible gas is reformed through reforming unit then enters into the drying unit for drying organic materials. One part of the purified combustible gas is combusted in the direction of combustion channel in the high temperature regenerative combustion unit, and the combustion heat is produced. At the same time, another part of combustible gas exchanges heat in the direction of heat exchanger channel in the regenerative combustion unit. Then it is used as pyrolysis activation medium entering into the pyrolysis unit in process of pyrolysis and activation reaction. The char is activated by the combustible gas in the pyrolysis unit then forms activated carbon. The sensible heat of the combustible pyrolysis gas is fully released through drying unit. A part of the combustible gas is combusted to produce heat as the required energy source of pyrolysis process. The combustible gas is used as pyrolysis medium and activator in the generation process of active carbon.

6 Claims, 1 Drawing Sheet

The schematic diagram of the system of active carbon production by pyrolysis of organic materials

(51) Int. Cl.
  *C10B 53/02* (2006.01)
  *C10K 3/02* (2006.01)
(52) U.S. Cl.
  CPC ............... *C10K 3/023* (2013.01); *Y02E 50/14* (2013.01); *Y02P 20/129* (2015.11)
(58) Field of Classification Search
  USPC .............................. 423/445 R, 460; 502/430
  See application file for complete search history.

(56) References Cited

U.S. PATENT DOCUMENTS 6,669,822 B1 * 12/2003 Fujimura ................. C01B 31/08
                                                                                                   201/20
2010/0043291 A1 * 2/2010 Ljunggren ............... 48/197 FM

FOREIGN PATENT DOCUMENTS

| CN | 101328423 A | 12/2008 | |
|---|---|---|---|
| CN | 101585535 A | 11/2009 | |
| CN | 101611123 A | 12/2009 | |
| SE | WO 2009145724 A2 * | 12/2009 | ............. C10B 49/06 |

* cited by examiner

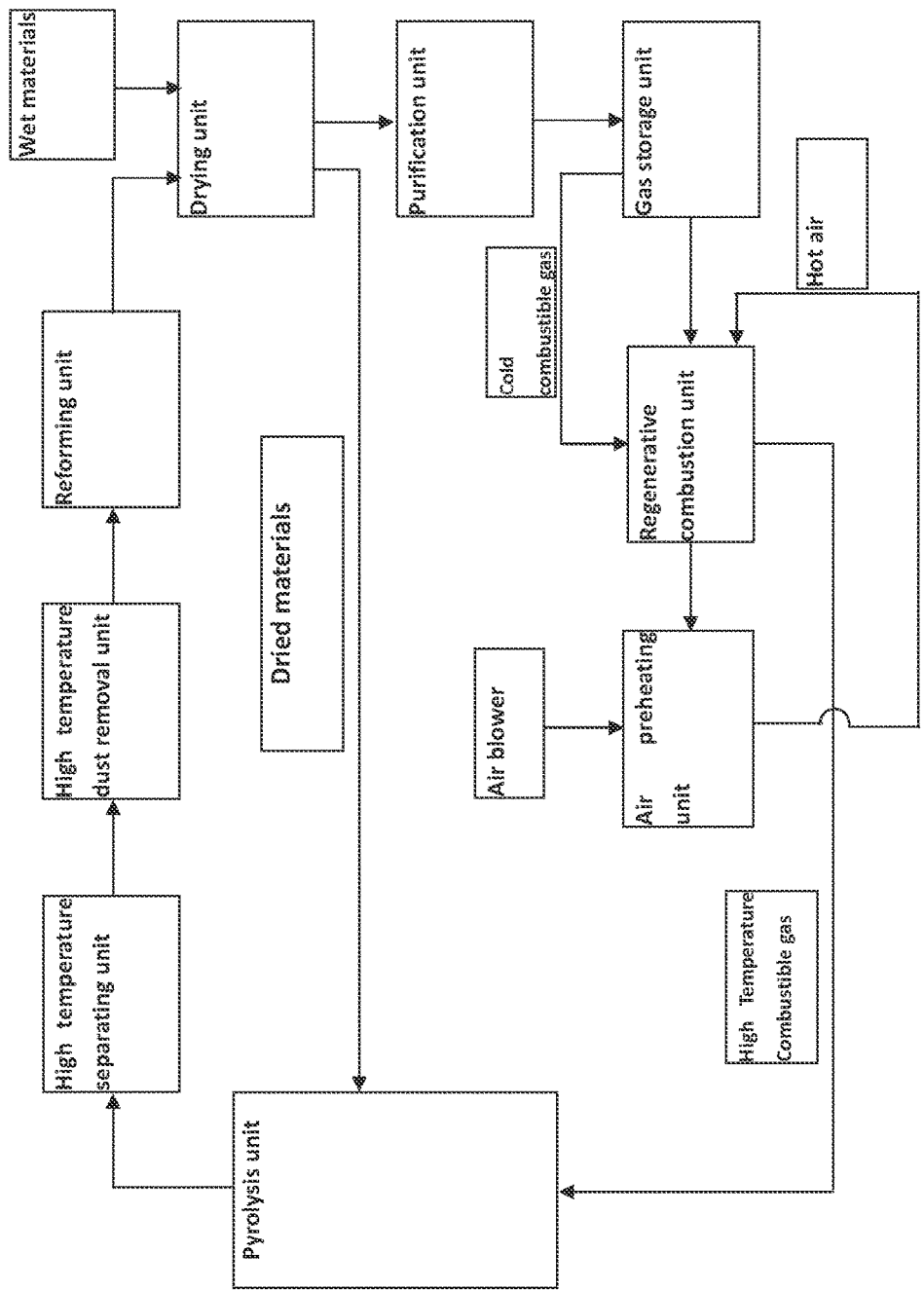
Figure 1 The schematic diagram of the system of active carbon production by pyrolysis of organic materials

METHOD FOR PREPARATION OF ACTIVE CARBON BY PYROLYSIS OF ORGANICS

TECHNICAL FIELDS

The present invention involves a method of pyrolysis of organic materials from activated carbon, which belongs to organic materials pyrolysis and activated carbon technology. It especially refers to the use of organic materials including organic solid waste, biomass, coal, urban sludge, oil field oil sludge, plastic, rubber, organic waste and its derivatives and other organic materials from pyrolysis and activated carbon manufacturing method.

BACKGROUND ART

Organic materials have a wide range variety and large output. Pyrolysis is an effective method for recycling of the organic materials. Tars, combustible gases, chars and other products would be produced when the organic materials were disposed by pyrolysis. High calorific value is stored in combustible gases and tars, and the activated carbon which is prepared by chars. Activated carbon has a high economic value, which is widely used in industrial processes and daily life.

The process of organic materials pyrolysis consumes a lot of energy. In present, most of the pyrolysis process consumes external energy to provide heat, and the energy consumption is high. For the activation of chars, the extrinsic gases such as water vapor, $CO_2$, air (mainly oxygen) or their mixtures always play the role of the activation medium. These activation methods mostly consume additional energy to provide heat for the activation process.

Technical Problems

The high temperature gas and the calorific value containing in the gases generated in the process of pyrolysis can provide the required energy. Making full use of the sensible heat of combustible gases and gas calorific value can greatly reduce the supply of external energy. The tars produced during the process of pyrolysis often envelop in the combustible gas, and it becomes the source of problems such as blockage, equipment corrosion. The tars contain high calorific value, and the restructuring of combustible gases can improve the grade of flammable gas and reduce the emissions of tars.

A Chinese patent titled "Activated Carbon Production Process through Co-pyrolysis of City Sludge and Agricultural Waste", presented a method of activated carbon production which application number is No. 200810123383.6. This method refers to the production process of activated carbon production process through co-pyrolysis of city sludge and agricultural waste. Its features are the mixture is heated at a preset temperature and isolated from the air. The method requires external energy for the pyrolysis process, and it needs high energy consumption. The material is enclosed in the reactor, and performs poor fluidization. The technical process, Patent Application No. 201010159906.X, named "Low-Temperature Pyrolysis of City Sludge Production of Bio-oil and Activated Carbon Method Simultaneously", refers to the low-temperature fluidized pyrolysis method of city sludge. This method requires a large amount of external energy to heat reactor, the sensible heat of the combustible gas of pyrolysis can not be fully utilized, and it can not solve many problems caused by tars.

Invention Content

The present invention provides a solution for the problems of high energy consumption in organic pyrolysis process and the activated carbon production process. This invention use combustible gases produced by pyrolysis of organic materials to provide energy for the pyrolysis process. The reformed and purified combustible gases pass through the high temperature heat regenerative unit and are heated to a high temperature level, then the combustible gas as pyrolysis medium is used for pyrolysis of organic materials. This invention achieves zero external energy supply during the pyrolysis of organic materials and the low-cost production of activated carbon.

The production method of activated carbon in this invention consists of pyrolysis unit, reforming unit, drying unit, purification unit, gas storage unit and high temperature regenerative combustion unit.

In the pyrolysis process, organic materials are put into the pyrolysis unit for thermal decomposition as pyrolysis materials, and then it will produce combustible gases, tars and chars. The combustible gas goes through high temperature separating unit and high temperature dust removal unit in turn, and then enters into reforming unit for partial combustion, thermal storage and reforming. The tars in pyrolysis gas are cracked in this process. Reforming unit is a reactor of high temperature reforming, and catalyst is used as reforming medium which catalyzes and reforms the tars in the combustible gas by reforming unit. The content of tars in the after-reforming combustible gas decreases significantly, while calorific value of combustible gas increases.

The combustible gas from reforming unit goes to drying unit, and it will be cooled by heat transfer drying unit. The wet organic materials are dried through drying unit. And the dried organic materials enter the pyrolysis unit for cracking reaction. In the process of drying, the combustible gas enters into drying unit through reforming unit. The sensible heat is recycled by drying unit.

The cooled combustible gas goes through purification unit, then into the gas storage unit. And then, the combustible gas in the storage unit is introduced into high temperature regenerative combustion unit for combustion. The high temperature fume from combustion keeps the regenerative combustion unit in a high temperature level, while the tail gas is discharged after heat exchange.

The combustible gas from the gas holding unit can be divided into two parts, one is burned in the regenerative combustion unit as fuel, the other is heated in the regenerative combustion unit. A lot of heat produced from the combustion process heat the combustible gas to high temperature combustible gas.

The high temperature combustible gas from the regenerative combustion unit goes into the pyrolysis unit as pyrolysis medium to provide heat for pyrolysis reaction. At the same time, it activates chars in the pyrolysis process for activated carbon production.

The regenerative combustion unit has two channels, a combustion channel and a heat transfer channel. The combustible gas burns in the combustion channel, while the combustible gas from the gas storage unit exchanges heat through the heat transfer channel. In this process, the combustible gas is rapidly heated, then high temperature combustible gas generates. A blower connected with the heat regenerative combustion unit which produces cool air to recycle the excess heat from the heat regenerative unit. At the same time, air is preheated and then is used for the combustion process.

The high temperature combustible gas from the regenerative combustion unit goes into the pyrolysis unit as pyrolysis medium to provide heat for pyrolysis reaction. At the same time, it activates chars in the pyrolysis unit, and the chars turn into activated carbon in this process.

The described organic materials pyrolysis units are fluidized bed, boiling bed, circulating fluidized bed or fixed bed reactor.

In this invention, the components of combustible gas in the pyrolysis process are $H_2$, $CO$, $CO_2$, $CH_4$, $C_2H_4$, $C_2H_6$, and $C_3H_8$. The inlet temperature of pyrolysis medium is 600-800° C. The moisture content of organic materials which enter into the pyrolysis unit is 20-30%.

The stated reactor is high temperature reforming reactor as high temperature reaction unit. The operating temperature of reforming reactor is 800-900° C. The air is preheated by regenerative combustion exhaust gas, which temperature is 150-200° C.

Advantages of the Invention (1) The prolysis of organic materials and the process of carbon production take advantage of the calorific value inherent in organic materials. The calorific value not only achieve enthetic zero energy supply, but also provide external energy.

(2) The pyrolytic medium is combustible pyrolysis gas. It is both the heat carrier medium and activator char to turn into activated carbon.

(3) The process of regenerative combustion can achieve of regenerative combustion of combustible gas.

(4) In the drying process, the sensible heat of combustible gases are utilized to dry organic material. The organic materials are converted from solid wastes into fuels.

(5) Without external energy, the whole reaction process meet the policy of energy conservation, (6) It is an effective solution for the problem of gasification gas purification. The pyrolysis tars are reformed in the process of reforming which reduce the tars and improve the calorific value of combustible gases.

ATTACHED FIGURE SHOWS

The FIGURE is schematic diagram of the system of active carbon production by pyrolysis of organic materials

THE SPECIFIC WAY OF IMPLEMENTING

The following graph is the detailed declaration for the specific way of implementing this invention The FIGURE shows the layout of the system of production of active carbon by organic materials pyrolysis. As shown in The FIGURE, organic materials are used as raw materials and pyrolyzed in the pyrolysis unit, then combustible gas and chars are produced. The combustible gas goes through the high temperature separating unit and high dust removal unit, and then enters into the reforming unit for reforming reaction. The tars in the combustible gas are cracked and the heat value of combustible gas is improved.

The hot combustible gas goes through an organic materials drying unit. Wet organic materials are dried by absorbing the sensible heat of combustible gases, after drying, the organic materials are used as pyrolysis feedstock and enter into the pyrolysis unit. High regenerative combustion unit has two channels, one is the combustion channel, and another is heat exchanger channel. The combustible gas goes through the purification unit and enters into the gas storage unit. Two pipelines are led out from the gas storage unit. One is connected with the combustion channel of the high temperature regenerative combustion unit, and another is connected with the heat exchange channel. Combustible gas is burned in the combustion channel. The temperature of regenerator increases, and the produced gas preheats cold air by an air heat exchanger. The preheated air enters into the regenerative combustor and then is uses as oxidant in the combustion reaction. Meanwhile, the combustible gas from the gas storage unit in another channel goes through the heat exchange channel and is heated to hot gas. These high-temperature combustible gases are used as a medium and enter into the pyrolysis unit to provide heat for the pyrolysis reaction, and it is also used as activator for the activation of the char produced in pyrolysis, thereby char is converted to activated carbon.

We claim:

1. A production method of producing activated carbon from wet organic materials comprising a pyrolysis unit, high temperature separating unit, reforming unit, heat transfer drying unit, purification unit, gas storage unit and high temperature regenerative combustion unit, comprising of the following the steps:

Step 1: drying the wet organic materials in heat transfer drying unit to produce a dried organic material;

Step 2: placing the dried organic materials into the pyrolysis unit for thermal decomposition to produce a combustible gas, tars and chars;

Step 3: passing the combustible gas and tar through a high temperature separating unit followed by a high temperature dust removal unit, and passing the output from the high temperature dust removal unit for partial combustion and reforming by contact with a catalyst to produce a partially combusted combustible gas wherein the tar is cracked;

Step 4: drying and cooling via heat transfer drying unit the partially combusted combustible gas to produce a cooled combustible gas and recycling remaining heat;

Step 5: purifying the cooled combustible gas and passing it into a gas storage unit, wherein the cooled combustible gas is divided into two parts, wherein one part is combusted with air in a high temperature regenerative combustion unit to produce a combusted tail gas which is discharged after heat exchange in air preheating unit and at the same time air is preheated for combustion process and the other part of the cooled combustible gas is heated by combusting the above part of cooled combustible gas in the regenerative combustion unit to produce a high temperature combustible gas; and Step 6: passing the high temperature combustible gas into the pyrolysis unit of step 2 to provide heat for pyrolysis reaction and simultaneously activate the chars to produce an activated carbon.

2. The production method according to claim 1, wherein the pyrolysis unit is selected from the group consisting of fluidized bed, boiling bed, circulating fluidized bed or fixed bed reactor.

3. The production method according to claim 1, wherein the reforming unit is a high temperature reforming unit.

4. The production method according to claim 1, wherein the temperature of the reforming unit is 800-900° C.

5. The production method according to claim 1, wherein the air temperature after preheating in step 5 is 150-200° C.

6. The production method according to claim 1, wherein the operating temperature of the high temperature regenerative combustion unit in step 5 is 800-900° C.

* * * * *